W. DITTRICH.
COTTON CHOPPER.
APPLICATION FILED JUNE 9, 1909.

952,310.

Patented Mar. 15, 1910.
2 SHEETS—SHEET 1.

Witnesses
W. N. Woodson
Juana M. Fallis

Inventor
William Dittrich,

By [signature], Attorneys

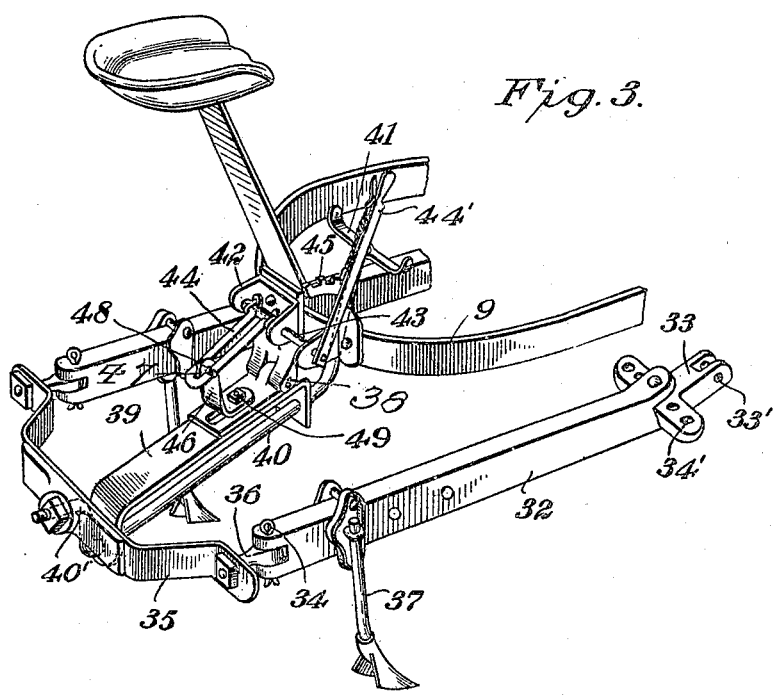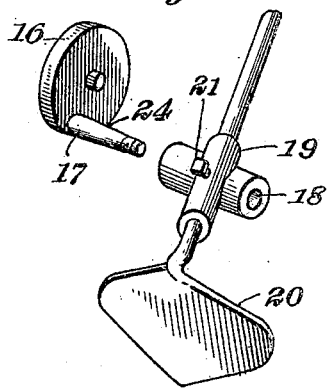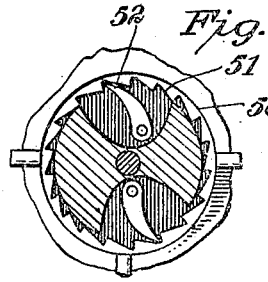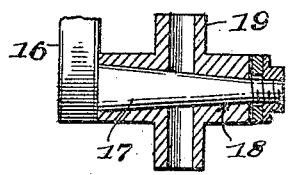

UNITED STATES PATENT OFFICE.

WILLIAM DITTRICH, OF LYTTON SPRINGS, TEXAS.

COTTON-CHOPPER.

952,310.  Specification of Letters Patent.  Patented Mar. 15, 1910.

Application filed June 9, 1909. Serial No. 501,125.

*To all whom it may concern:*

Be it known that I, WILLIAM DITTRICH, citizen of the United States, residing at Lytton Springs, in the county of Caldwell and State of Texas, have invented certain new and useful Improvements in Cotton-Choppers, of which the following is a specification.

This invention relates to cotton choppers and has for its object to provide a strong, durable and thoroughly efficient machine of the class described for thinning rows of cotton plants so as to allow the remaining plants to fully mature.

A further object of the invention is to provide a cotton chopper including a truck having pivotally mounted front and rear frames, one of which carries an oscillating chopping element or hoe, and the other a plurality of cultivator teeth or plows, said frames being adjustable independently in a vertical plane, thereby to raise the cultivator teeth and hoe respectively.

A further object is to so arrange the pivoted cultivator frame as to permit the teeth or plows to adapt themselves to the furrows when the machine is caused to travel between rows of growing cotton plants.

A still further object of the invention is generally to improve this class of devices so as to increase their utility, durability, and efficiency.

Further objects and advantages will appear in the following description, it being understood that various changes in form, proportions and minor details of construction may be resorted to within the scope of the appended claims.

Figure 1:
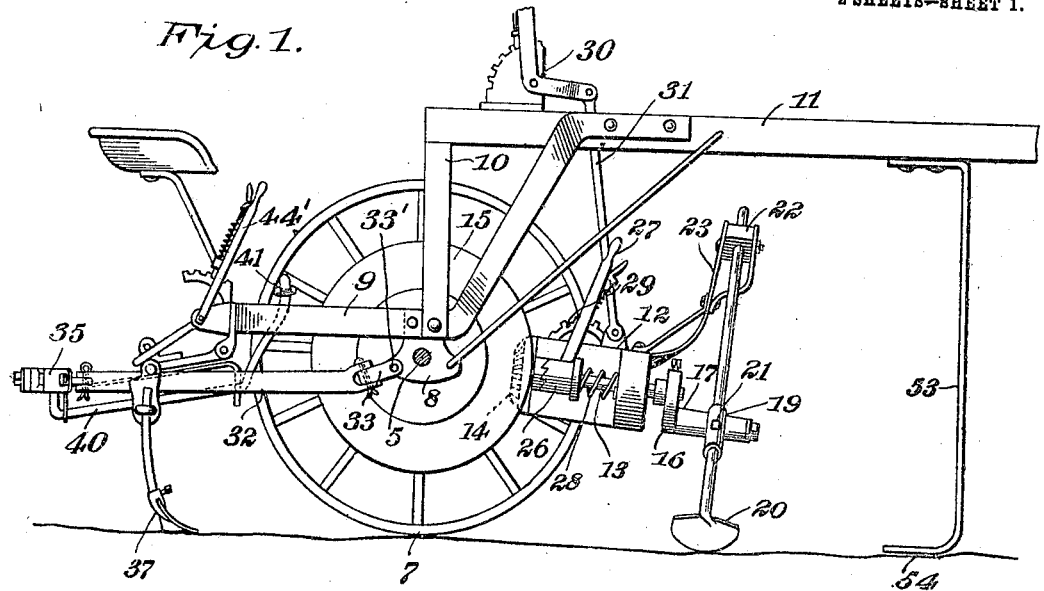
Figure 2:
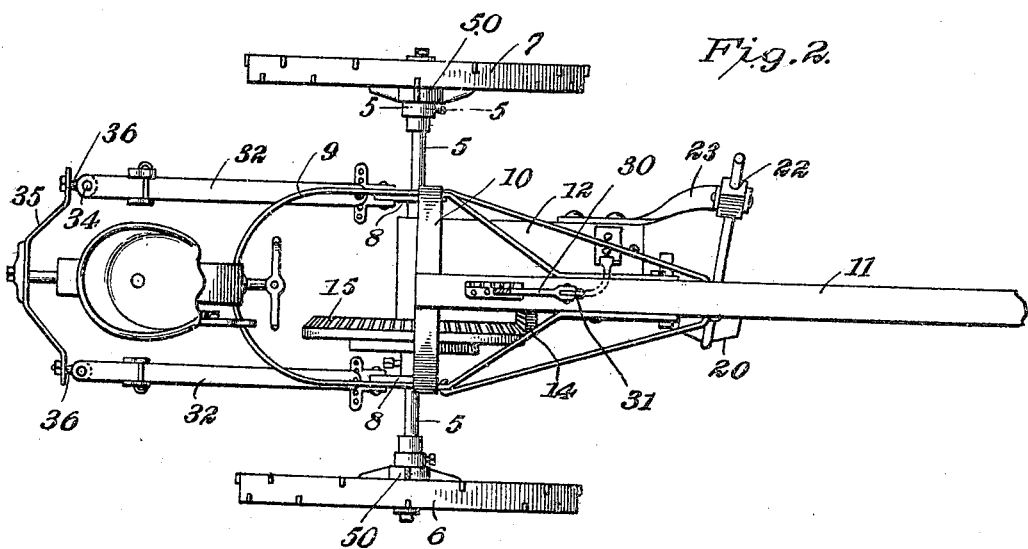

For a full understanding of the invention and the merits thereof and also to acquire a knowledge of the details of construction and the means for effecting the result, reference is to be had to the following description and accompanying drawings, in which:

Figure 1 is a side elevation partly in section of a cotton chopper constructed in accordance with my invention; Fig. 2 is a top plan view of the same; Fig. 3 is a detail perspective view of a portion of the rear cultivator frame; Fig. 4 is a detail perspective view of the hoe and crank disk detached, the hoe receiving collar being detached from the crank pin; Fig. 5 is a transverse sectional view taken on the line 5—5 of Fig. 2; Fig. 6 is a longitudinal sectional view of the hoe carrying socket.

Corresponding and like parts are referred to in the following description and indicated in all the views of the drawings by the same reference characters.

The improved cotton chopper forming the subject matter of the present invention comprises a truck including an axle 5 carrying ground wheels 6 and 7 and provided with spaced intermediately disposed uprights or brackets 8 to which is secured a rigid supporting frame. The main supporting frame is formed of intersecting yokes 9 and 10 preferably disposed at right angles to each other as shown, the opposite ends of one of said yokes being extended upwardly and fastened in any suitable manner to a draft beam 11, the other yoke being extended downwardly over the adjacent brackets 8 and bolted or otherwise rigidly secured thereto.

Pivotally mounted on the axle 5 between the brackets 8 is a forward frame 12 having a longitudinally disposed shaft 13 journaled therein, the inner end of which is provided with a bevel pinion 14 which meshes with the teeth of a relatively large gear 15 keyed or otherwise rigidly secured to the shaft 13 at one side of the pivoted frame 12. The forward end of the shaft 13 is extended longitudinally beyond the free end of the pivoted frame 12 and fastened in any suitable manner to the projecting end of said shaft, is a disk 16 having a crank pin 17 extending laterally therefrom and disposed eccentric to the shaft 13. The crank pin 17 is preferably tapered and fits in the correspondingly tapered socket 18 of a collar 19 carrying a chopping element or hoe, indicated at 20. The shank of the hoe 20 is adjustable longitudinally within the collar 19 and is clamped in adjusted position by a screw or similar fastening device 21. The upper end of the hoe shank fits in a bearing block 22 carried by a supporting bracket 23 arranged on one side of the frame 12, said bearing block being pivotally mounted on the bracket 23 so as to accommodate itself to the different angular positions assumed by the chopping element or hoe as the truck is caused to travel between rows of growing cotton plants.

One side of the forward frame 12 is formed with a recess through which passes the intermediate portion of the shaft 13, there being a spring actuated clutch member 26 keyed to the shaft 13 and arranged to engage a corresponding clutch member formed on the pinion 14, thereby to transmit motion from the master gear 15 to the shaft 13 to actuate the chopping device or hoe. A lever 27 is operatively connected with the sliding clutch member 26 for the purpose of moving said member against the tension of the coil spring 28 out of engagement with the mating clutch member on the pinion 14, there being a suitable rack 29 fastened to the forward frame 12 and adapted to engage the lever 27 for holding the sliding clutch member 26 out of engagement with the mating member.

As a means for raising and lowering the forward frame in order to regulate the height of the chopping device or hoe, there is provided a lever 30 pivotally mounted on a bracket carried by the draft beam 11 and to the short end of which is connected the adjacent end of a rod 31, the opposite end of which is fastened to the free end of the pivoted frame 12, so that by manipulating the lever 30, the forward frame may be adjusted. The bracket of the lever 30 is provided with a segmental rack for the purpose of locking the lever 30 in position after the adjustment of the forward frame 12 has been effected.

Pivotally connected with the axle 5 is a rear frame including side bars 32 having their inner ends pivotally connected through the medium of pivoted blocks or clevis members 33 with rearward extensions formed on the brackets 8 and their outer ends pivotally connected at 34 with an end bar 35, there being bolts 36 swiveled in the end bar 35 and having their inner portions provided with perforated heads arranged to fit in the bifurcated portions of the adjacent side bars 32 to permit of the insertion of the pivot pin 34. By making the rear frame in this manner, the cultivator shovels or plows 37 may adapt themselves to the furrows as the machine is caused to travel over a field, the pivots 33' and 34 forming in effect a universal joint so as to allow free pivotal movement of the rear frame. It will also be noted that by forming the clevis members 33 with a series of perforations 34' the side members 32 may be adjusted laterally of the machine to accommodate rows of different widths.

Pivotally connected at 38 to the horizontal yoke 9 is a connecting bar 39 having depending flanges provided with alined openings for the reception of a longitudinally disposed rod or shaft 40. One end of the shaft 40 is bent to produce a crank 40', the terminal of which pierces a portion of the end bar 35 for engagement with a clamping bolt, the other end of the rod 40 being extended upwardly and provided with a foot piece 41 which operates to shift the frame laterally when desired.

Secured to the rear end of the horizontal yoke 9 are spaced perforated ears or lugs 42 in which is journaled a rod 43 having an intermediate portion thereof provided with an angularly disposed arm 44. One end of the rod 43 is provided with an operating handle 44' for engagement with a suitable rack 45.

Secured to the connecting bar 39 is a plate 46 having an upstanding ear 47 projecting between the walls of the arm 44 and provided with a terminal opening for the reception of a transverse pin 48, the latter being arranged to bear against the upper surface of the arm 44 so that when the lever 44' is moved in the direction of the axle 5, the cultivator frame will be tilted upwardly. The plate 46 is adjustable longitudinally with respect to the connecting bar 39 in order to change the position of the ear 47 with respect to the arm 44 and thus regulate the throw or movement of the cultivator frame, said plate being locked in adjusted position by a bolt or similar fastening device 49.

The ground wheels 6 and 7 are provided with bearing collars 50 having their exterior wall formed with a plurality of ratchet teeth 51 for engagement with suitable pawls 52 carried by enlargements on the axle 5, the pawl and ratchet mechanism just described, allowing the wheel to rotate in one direction but preventing rotation of the wheel in the opposite direction.

A brace 53 is secured to the draft beam with its lower end bent laterally to form a shoe 54 adapted to bear against the surface of the ground and prevent tilting movement of the truck when the draft animals are detached therefrom.

Thus it will be seen that as the truck is caused to travel between the rows of cotton plants, motion will be transmitted from the ground wheels through the medium of the pinions 14 and 15 to the shaft 13, thereby to rotate the crank disk and thus transmit motion to the hoe for the purpose of chopping or thinning out certain of the growing cotton plants and leaving the remaining plants standing. It will also be observed that the front and rear frames are adjustable vertically and independently of each other, while the rear cultivator frame may be adjusted by either manipulating the foot or hand lever.

By connecting the end bar 35 to the side bars 32 of the rear frame, said end bar is free to tilt laterally on the shaft or rod 40, in the manner before stated.

Having thus described the invention, what is claimed as new is:

1. A cotton chopper including a wheeled truck, a frame rigidly secured to the truck, a cultivator frame pivotally mounted on the axle of the truck and including spaced side bars connected by an end bar, a bracket depending from the rigid frame, a longitudinal bar pivotally connected with the bracket and provided with depending perforated ears, a rod journaled in the perforations in the ears and having one end thereof extending through the end bar of the pivoted frame and its other end bent upwardly to form a foot piece, and a hand lever connected with the longitudinal bar for effecting the vertical adjustment of the frame.

2. A cotton chopper including a wheeled truck, a rigid frame secured to the truck, a cultivator frame pivotally mounted on the axle of the truck beneath the rigid frame and including pivoted side bars connected with each other by an end bar, a bracket depending from the rigid frame, a longitudinal bar connected with the bracket and provided with alined openings, a rod extending through said openings and having one end piercing the end bar of the frame and its other end terminating in a foot piece, perforated lugs carried by the bracket, a rod journaled in said lugs and having an angularly disposed slotted arm, an ear carried by the longitudinal connecting bar and extending through the slot in said arm, cultivator shovels carried by the side bars of the frame, and an operating handle extending at an angle to the arm for raising and lowering the cultivator frame.

3. A cotton chopper including a wheeled truck having a draft tongue and provided with intersecting yokes, the arms of one of which is connected with the draft tongue, said yokes constituting a rigid frame, brackets extending vertically from the truck axle and connected with the arms of the yokes, a cultivator frame pivotally mounted on the axle of the truck, and including pivotally connected side and end bars, cultivator shovels depending from the side bars of said frame, a bracket depending from one of the yokes of the rigid frame, a longitudinal bar pivotally connected with the bracket and provided with alined openings, a rod having an intermediate portion extended through the openings in the bar, one end of said rod being journaled in the end bar of the frame and the other end thereof extended upwardly to form a foot piece, an operating lever journaled on the rigid supporting frame and provided with a slotted arm, an ear adjustable longitudinally on the arm and projecting upwardly through the slot in the arm, and a pin extending through the free end of the ear and bearing against said arm.

In testimony whereof I affix my signature in presence of two witnesses.

WILLIAM DITTRICH. [L. S.]

Witnesses:
G. H. WILLIAM,
E. B. ROBERTSON.